United States Patent
Ye

(10) Patent No.: US 12,041,165 B2
(45) Date of Patent: *Jul. 16, 2024

(54) KEY UPDATING METHOD, APPARATUS, AND SYSTEM

(71) Applicant: TENCENT TECHNOLOGY (SHENZHEN) COMPANY LIMITED, Shenzhen (CN)

(72) Inventor: Xuan Ye, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 390 days.

This patent is subject to a terminal disclaimer.

(21) Appl. No.: 17/368,798

(22) Filed: Jul. 6, 2021

(65) Prior Publication Data
US 2021/0336780 A1 Oct. 28, 2021

Related U.S. Application Data

(63) Continuation of application No. 15/952,614, filed on Apr. 13, 2018, now Pat. No. 11,088,836, which is a (Continued)

(30) Foreign Application Priority Data

Jan. 8, 2016 (CN) .......................... 201610012443.1

(51) Int. Cl.
*H04L 9/08* (2006.01)
*H04L 9/14* (2006.01)
(Continued)

(52) U.S. Cl.
CPC ............. *H04L 9/0891* (2013.01); *H04L 9/14* (2013.01); *H04L 9/30* (2013.01); *H04L 9/3247* (2013.01)

(58) Field of Classification Search
CPC . H04L 9/0891; H04L 9/14; H04L 9/30; H04L 9/32; H04L 9/3247
See application file for complete search history.

(56) References Cited

U.S. PATENT DOCUMENTS 5,915,025 A    6/1999  Taguchi et al.
7,194,759 B1   3/2007  Chess et al.
(Continued)

FOREIGN PATENT DOCUMENTS

CN       1534936 A    10/2004
CN     101009553 A     8/2007
(Continued)

OTHER PUBLICATIONS

The World Intellectual Property Organization (WIPO) International Search Report for PCT/CN2017/070436 Feb. 23, 2017 7 Pages (including translation).
(Continued)

*Primary Examiner* — Hosuk Song
(74) *Attorney, Agent, or Firm* — Anova Law Group, PLLC

(57) ABSTRACT

A key updating method includes receiving, by a terminal, a key updating notification sent by an operation server, generating, by the terminal, a new private key and a new public key using a trusted execution environment (TEE) system of the terminal, storing the new private key in the TEE system, performing signature processing on the new public key using an upper-level private key of the new private key to obtain to-be-verified signature information, and sending, by the terminal to the operation server, a storage request carrying a device identifier of the terminal, the new public key, and the to-be-verified signature information.

20 Claims, 8 Drawing Sheets

Related U.S. Application Data continuation of application No. PCT/CN2017/070436, filed on Jan. 6, 2017.

(51) Int. Cl.
*H04L 9/30* (2006.01)
*H04L 9/32* (2006.01)

(56) References Cited

U.S. PATENT DOCUMENTS

| | | | | |
|---|---|---|---|---|
| 7,451,307 | B2 * | 11/2008 | Matsushima | H04L 63/0823 |
| | | | | 713/168 |
| 7,836,311 | B2 * | 11/2010 | Kuriya | H04L 63/0428 |
| | | | | 713/193 |
| 7,917,764 | B2 * | 3/2011 | Futa | H04L 9/3263 |
| | | | | 380/278 |
| 8,015,399 | B2 * | 9/2011 | Imai | H04L 63/0823 |
| | | | | 380/258 |
| 8,098,827 | B2 * | 1/2012 | Okaue | H04L 9/0836 |
| | | | | 380/278 |
| 8,160,246 | B2 * | 4/2012 | Kim | H04L 9/0836 |
| | | | | 380/279 |
| 11,088,836 | B2 * | 8/2021 | Ye | H04L 9/3247 |
| 11,184,161 | B2 * | 11/2021 | Buck | H04L 9/088 |
| 11,240,008 | B2 * | 2/2022 | Pan | H04L 9/3263 |
| 2005/0149722 | A1 | 7/2005 | Wiseman et al. | |
| 2010/0189265 | A1 | 7/2010 | Ito et al. | |
| 2011/0271110 | A1 | 11/2011 | Ohba et al. | |
| 2016/0285638 | A1 | 9/2016 | Pearson et al. | |
| 2016/0285832 | A1 | 9/2016 | Petrov et al. | |

FOREIGN PATENT DOCUMENTS

| | | |
|---|---|---|
| CN | 101170407 A | 4/2008 |
| CN | 101888628 A | 11/2010 |
| CN | 102740241 A | 10/2012 |
| CN | 103856473 A | 6/2014 |
| CN | 105515768 A | 4/2016 |

OTHER PUBLICATIONS

The State Intellectual Property Office of the People's Republic of China (SIPO) Office Action 1 for 201610012443.1 Oct. 17, 2016 11 Pages (including translation).

* cited by examiner

KEY UPDATING METHOD, APPARATUS, AND SYSTEM

CROSS-REFERENCE TO RELATED APPLICATIONS

This application is a continuation applications of U.S. patent application Ser. No. 15/952,614, filed on Apr. 13, 2018, which in turn claims priority to PCT International Application No. PCT/CN2017/070436, filed on Jan. 6, 2017, which in turn claims priority to Chinese Patent Application No. 201610012443.1, entitled "KEY UPDATING METHOD, APPARATUS, AND SYSTEM" filed with the Chinese Patent Office on Jan. 8, 2016, all of which are incorporated by reference in their entirety.

FIELD OF THE TECHNOLOGY

The present disclosure relates to the field of electronic technologies and, in particular, to a key updating method, apparatus, and system.

BACKGROUND OF THE DISCLOSURE

With the development of electronic technologies, mobile terminals such as smartphones and tablet computers are increasingly widely used. To ensure security of service information, a terminal usually uses a key to encrypt the service information. After receiving the service information, an operation server may decrypt the encrypted service information by using a prestored key.

When a key needs to be updated, the terminal usually sends a key updating request to the operation server, and then the operation server returns a key updating response. Then, the terminal generates a new key, encrypts the new key by using an original key, and sends the encrypted new key to the operation server. Finally, the operation server decrypts the encrypted new key by using the original key, and stores the new key.

In a process of updating a key, if an original key expires or is disclosed, and a new key is encrypted by using the original key, validity and security of the new key cannot be ensured, leading to relatively low security of updating a key.

SUMMARY

In accordance with the disclosure, there is provided a key updating method including receiving, by a terminal, a key updating notification sent by an operation server, generating, by the terminal, a new private key and a new public key using a trusted execution environment (TEE) system of the terminal, storing the new private key in the TEE system, performing signature processing on the new public key using an upper-level private key of the new private key to obtain to-be-verified signature information, and sending, by the terminal to the operation server, a storage request carrying a device identifier of the terminal, the new public key, and the to-be-verified signature information.

Also in accordance with the disclosure, there is provided a key updating method including sending, by an operation server, a key updating notification to a terminal, receiving, by the operation server, a storage request sent by the terminal and carrying a device identifier of the terminal, a new public key, and to-be-verified signature information, obtaining, by the operation server, an upper-level public key of the new public key corresponding to the device identifier, performing signature verification processing on the to-be-verified signature information based on the upper-level public key and the new public key, and storing the new public key if the signature verification succeeds.

Also in accordance with the disclosure, there is provided an operating server including a processor and a memory storing instructions. The instructions, when executed by the processor, cause the processor to send a key updating notification to a terminal, receive a storage request sent by the terminal and carrying a device identifier of the terminal, a new public key, and to-be-verified signature information, obtain an upper-level public key of the new public key corresponding to the device identifier, perform signature verification processing on the to-be-verified signature information based on the upper-level public key and the new public key, and store the new public key if the signature verification succeeds.

BRIEF DESCRIPTION OF THE DRAWINGS

To more clearly describe the technical solutions in the embodiments of the present disclosure, drawings of the present disclosure are briefly described below. Apparently, the accompanying drawings in the following description show merely some embodiments of the present disclosure, and persons of ordinary skill in the art may derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

Embodiments of the present disclosure provide a key updating method. The method may be jointly implemented by a terminal and an operation server. The terminal may be a terminal having a function of generating a key, and may be a mobile terminal such as a smartphone or a tablet computer. The operation server may be a server used for service processing, and for example, may be a server used for online payment processing. A processor, a memory, and a transceiver may be disposed in the terminal. The processor may be used for processing related to signature information encryption. The memory may be used for storing data required and generated in a process below. The transceiver may be used for receiving and sending data. A biometric recognition component may further be disposed. The biometric recognition component may be used for detecting biometric feature information that is currently input. A processor, a memory, and a transceiver may be disposed in the operation server. The processor may be used for decrypting to-be-verified signature information sent by the terminal, determining whether to process a service corresponding to a service execution request, and performing processing related to service processing when matching information obtained by means of decryption with signature information. The memory may be used for storing data required and generated in a process below. The transceiver may be used for receiving and sending data. In this solution, a device private key is an upper-level private key of an application private key, the application private key is an upper-level private key of a service private key, a device public key is an upper-level public key of an application public key, and the application public key is an upper-level public key of a service public key. For corresponding conceptions of terms, refer to detailed descriptions below.

Figure 1:
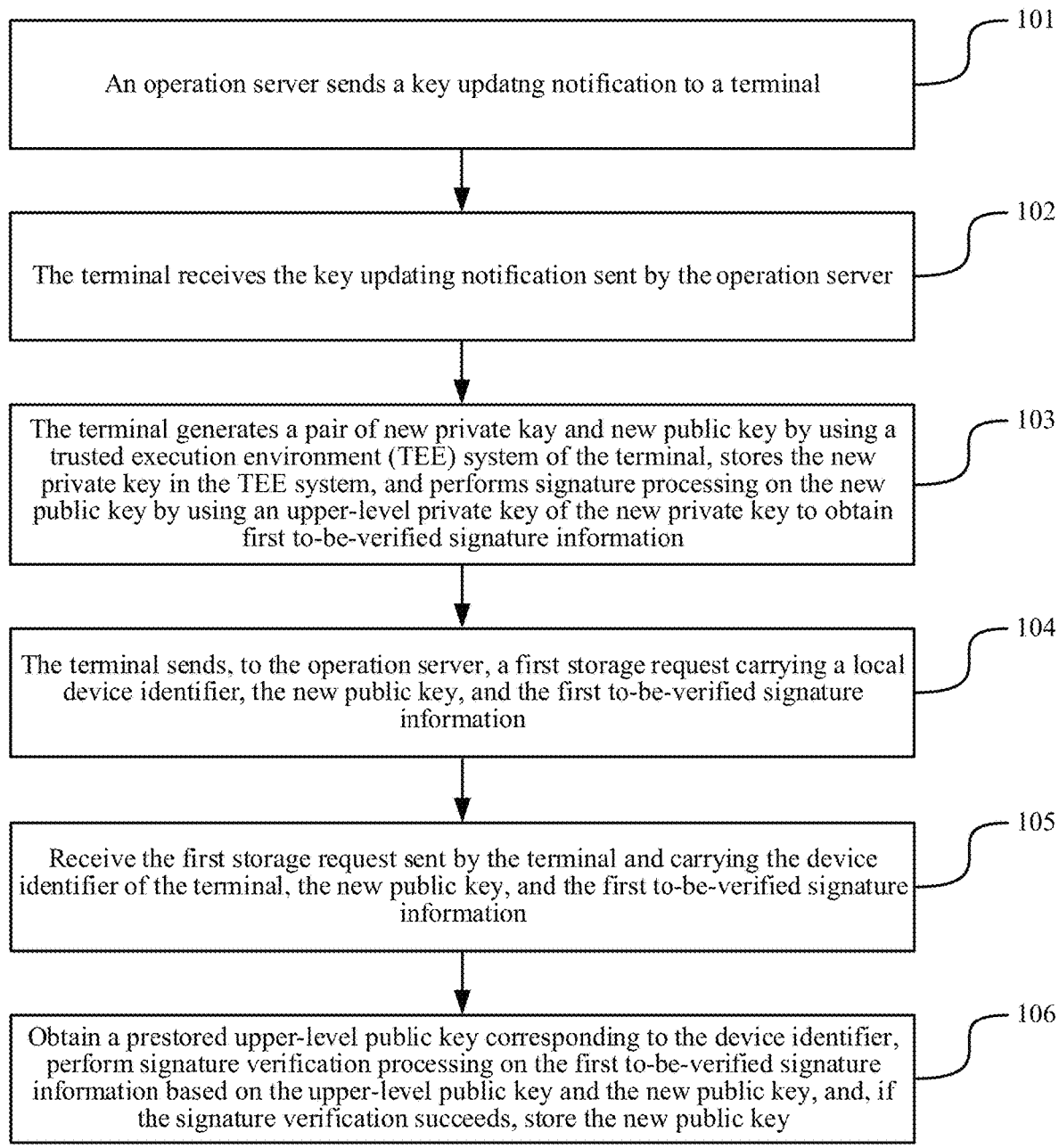
FIG. 1 is a flowchart of a key updating method according to an embodiment of the present disclosure.

FIG. 1 is a flowchart of a key updating method consistent with the disclosure. As shown in FIG. 1, at 101, an operation server sends a key updating notification to a terminal.

The operation server may be a server used for service processing, or may be a background server of an application program in the terminal and having a service processing function. For example, the operation server may be a background server of WeChat. A key may include a pair of a private key and a public key generated by the terminal and matching with each other. The terminal stores the private key locally, and sends the public key to the operation server for storing in the operation server.

In some embodiments, an application program used for implementing service processing may be installed on the terminal. For example, an application program (such as WeChat) used for implementing online payment processing may be installed on the terminal. Correspondingly, a user may set a key for the application program or some services of the application program through the terminal. As such, information may be encrypted by using the key during information transmission, and security of the information during the process of information transmission can be ensured. In addition, the foregoing key may be stored in the operation server, and the key may be bound with the terminal. When receiving the encrypted information sent by the terminal, the server may decrypt the encrypted information by using the key corresponding to the terminal, thereby obtaining the transmitted information. When finding that a key stored locally needs to be updated, the operation server may send a key updating notification to a terminal bound with the key, to notify the terminal to generate a new key.

Optionally, the operation server may be triggered to send a key updating notification to the terminal in various manners. Two examples are described below:

Example one: If it is detected that a duration of a public key stored locally reaches a preset duration threshold after being generated, a prestored device identifier corresponding to the public key is obtained, and a key updating notification is sent to a terminal corresponding to the device identifier.

In some embodiments, to ensure information security, validity period may be set for a generated key. That is, the key may automatically become invalid after a preset duration. The operation server may detect periodically whether a public key stored locally is in the validity period, or detect whether the public key is in the validity period when the public key needs to be invoked. If detecting that the duration of the public key stored locally reaches the preset duration threshold after being generated, the operation server may obtain a device identifier corresponding to the public key, and further may send a key updating notification to a terminal corresponding to the device identifier.

Example two: When a key updating request sent by the terminal is received in the server, a key updating notification is sent to the terminal.

In some embodiments, when finding that a key may be already disclosed or the key is about to expire, a user may send a key updating request to the operation server using the terminal, to request for updating the key. After receiving the key updating request sent by the terminal, the server may send the key updating notification to the terminal, to notify the terminal to generate a new key.

At 102, the terminal receives the key updating notification sent by the operation server.

In some embodiments, after the operation server sends the key updating notification to the terminal, the terminal may receive the key updating notification sent by the operation server.

At 103, the terminal generates a pair of new private key and new public key by using a trusted execution environment (TEE) system in a secure area of the terminal, stores the new private key in the TEE system, and performs signature processing on the new public key by using an upper-level private key of the new private key, to obtain first to-be-verified signature information.

The TEE system may be a system in the terminal and used for verifying biometric feature information and encrypting signature information. Data stored and processed in the TEE system is secure. The TEE system may be independent from another system (such as an Android system) in the terminal. A key generation application may be installed in the TEE system. The key generation application may be considered as secure in a key generation and storage process.

In some embodiments, after receiving the key updating notification sent by the operation server, the terminal may start the key generation application in the TEE system, generate, according to hardware information of the terminal and a preset algorithm, the pair of new private key and new public key matching with each other, and apply the key to the foregoing application program corresponding to the operation server. Further, the terminal may store the new private key in a key storage area of the TEE system, so that security of the new private key can be ensured. Then, the terminal may perform signature processing on the new public key by using an upper-level private key of the new private key, to obtain the first to-be-verified signature information. In this embodiment, a key chain generating method is used for generating the key, as follows. When a first-level key exists, legality of a second-level key generated subsequently may be verified by using the first-level key. Further, legality of a third-level key generated subsequently may be verified by using the second-level key, and so on. A relationship among subsequent Nth-level keys is the same as that described above.

At 104, the terminal sends, to the operation server, a first storage request carrying a local device identifier, the new public key, and the first to-be-verified signature information.

In some embodiments, after generating the first to-be-verified signature information, the terminal may send the first storage request to the operation server. The first storage request may carry the device identifier of the terminal, the new public key, and the first to-be-verified signature information.

At 105, the operation server receives the first storage request sent by the terminal and carrying the device identifier of the terminal, the new public key, and the first to-be-verified signature information.

In some embodiments, after the terminal sends, to the operation server, the first storage request carrying the local device identifier, the new public key, and the first to-be-verified signature information, the operation server may receive the first storage request.

At 106, a prestored upper-level public key corresponding to the device identifier is obtained, and signature verification processing is performed on the first to-be-verified signature information based on the upper-level public key and the new public key. If the signature verification succeeds, the new public key is stored.

In some embodiments, after receiving the first storage request sent by the terminal, the operation server may parse the first storage request to obtain the device identifier, the new public key, and the first to-be-verified signature information carried in the first storage request, and may further obtain the prestored upper-level public key corresponding to the device identifier carried in the first storage request, then perform signature verification processing on the first to-be-verified signature information based on the obtained upper-level public key and new public key, and determine whether the signature verification succeeds. If the signature verification succeeds, the operation server may correspondingly store the device identifier and the new public key. Otherwise, the operation server may not store the device identifier and the new public key.

Figure 2:
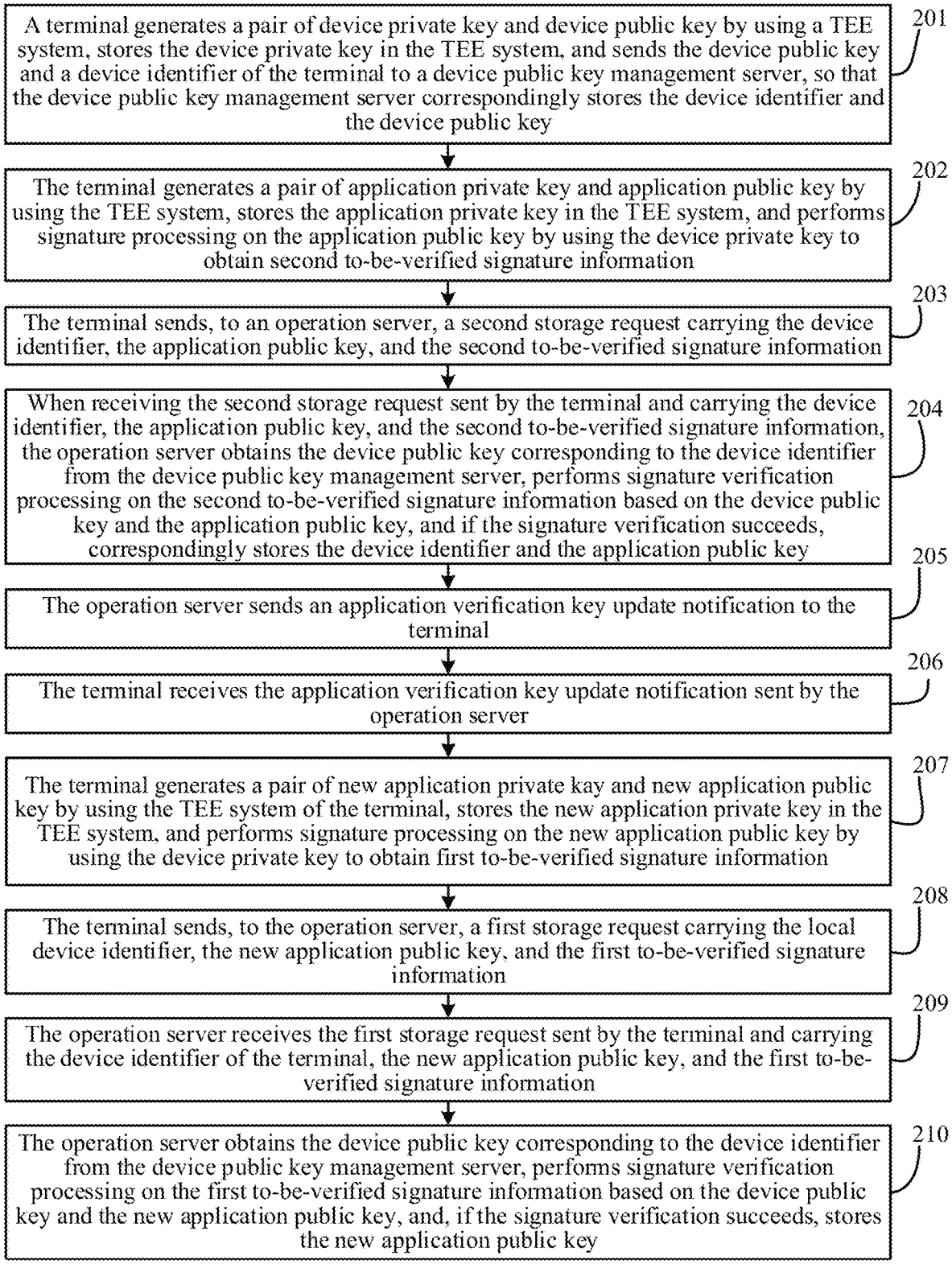
FIG. 2 is a flowchart of a key updating method according to another embodiment of the present disclosure.

In some embodiments, the foregoing key updating procedure may be applied to update an application verification key (which may also be referred to as a second-level key). FIG. 2 is a flowchart showing a method for updating the application verification key consistent with the disclosure. As shown in FIG. 2, at 201, a terminal generates a pair of device private key and device public key (i.e., the first-level key above) by using a TEE system, stores the device private key in the TEE system, and sends the device public key and a device identifier of the terminal to a device public key management server, so that the device public key management server correspondingly stores the device identifier and the device public key.

The pair of device private key and device public key are parts of a device verification key, which can be used for verifying the legality of the terminal, and for generating an application verification key. The device private key may be internally installed in a secure area of the terminal by a manufacture of the terminal before the terminal is delivered. The device public key is stored in the device public key management server. Each terminal only has one device verification key.

In some embodiments, the terminal may generate the device verification key by using the TEE system. The device verification key includes the device private key and the device public key. The pair of device private key and device public key may be generated according to hardware information of the terminal and a preset algorithm by using the TEE system in the terminal before the terminal is delivered. Different terminals correspond to different device private keys and device public keys. After the pair of device private key and device public key is generated, the generated device private key may be stored in the TEE system. Since the device private key is stored in the secure area, another terminal cannot obtain the device private key. The generated device public key and the device identifier of the terminal are sent to the device public key management server. The device public key management server may be used for storing the device public key generated before the terminal is delivered. The device public key management server may receive the device public key and the device identifier sent by the terminal. Further, the device identifier and the device public key may be correspondingly stored.

At 202, the terminal generates a pair of application private key and application public key by using the TEE system, stores the application private key in the TEE system, and performs signature processing on the application public key by using the device private key, to obtain second to-be-verified signature information.

The application verification key includes the pair of application private key and application public key, and can be generated by an application program by using a preset algorithm. The application private key is stored in a secure storage area. The application public key is stored in the operation server. The application verification key may be used for verifying security and an identity of the application program, and for generating a service verification key. Each application program only has one application verification key. If a new application verification key is generated, an old application verification key generated previously will be covered.

In some embodiments, after completing installing an application program (such as WeChat) used for implementing service processing, and when starting the application program for the first time, the terminal may generate the application verification key by using the TEE system. The application verification key includes the application private key and the application public key. The pair of application private key and application public key may be generated according to hardware information of the terminal and a preset algorithm by using the TEE system in the terminal. The application program in the terminal corresponds to the pair of application private key and application public key. That is, the generated pair of application private key and application public key corresponds with the application program, and does not correspond with an account logging in to the application program. After the pair of application private key and application public key is generated, the application private key may be stored in the TEE system, and signature processing may be performed on the generated application public key by using the device private key prestored in the terminal, to obtain the second to-be-verified signature information. This process may be considered as the terminal generating the application verification key corresponding to the foregoing application program for the first time.

At 203, the terminal sends, to the operation server, a second storage request carrying the device identifier, the application public key, and the second to-be-verified signature information.

In some embodiments, after obtaining the second to-be-verified signature information, the terminal may send the second storage request to the operation server. The second storage request may carry the device identifier, the application public key, and the second to-be-verified signature information.

At 204, when receiving the second storage request sent by the terminal and carrying the device identifier, the application public key, and the second to-be-verified signature information, the operation server obtains the device public key corresponding to the device identifier from the device public key management server, performs signature verification processing on the second to-be-verified signature information based on the device public key and the application public key, and if the signature verification succeeds, correspondingly stores the device identifier and the application public key.

In some embodiments, after the terminal sends, to the operation server, the second storage request carrying the device identifier, the application public key, and the second to-be-verified signature information, the operation server may receive the second storage request sent by the terminal, and parse the second storage request, to obtain the device identifier, the application public key, and the second to-be-verified signature information carried in the second storage request. Then, the operation server may obtain the device public key corresponding to the device identifier carried in the storage request from the device public key management server, perform signature verification processing on the second to-be-verified signature information based on the obtained device public key and application public key, and determine whether the signature verification succeeds. If the signature verification succeeds, the operation server may correspondingly store the device identifier and the application public key. Otherwise, the operation server does not store the device identifier and the application public key. This process may be considered as the operation server storing the application public key corresponding to the foregoing device identifier for the first time.

At 205, the operation server sends an application verification key updating notification to the terminal.

At 206, the terminal receives the application verification key updating notification sent by the operation server.

At 207, the terminal generates a pair of new application private key and new application public key by using the TEE system of the terminal, stores the new application private key in the TEE system, and performs signature processing on the new application public key by using the device private key, to obtain first to-be-verified signature information.

In some embodiments, update processing for an application verification key is similar to a process of generating an application verification key. Specifically, after receiving the key updating notification sent by the operation server, the terminal may start the key generation application in the TEE system, and generate, according to hardware information of the terminal and a preset algorithm, the pair of new application private key and new application public key matching with each other. Then, the terminal may delete the original application private key stored locally, and store the new application private key in a key storage area of the TEE system. At the same time, the terminal may perform signature processing on the new application public key by using the device private key, thereby obtaining the first to-be-verified signature information.

At 208, the terminal sends, to the operation server, a first storage request carrying the local device identifier, the new application public key, and the first to-be-verified signature information.

In some embodiments, after generating the first to-be-verified signature information, the terminal may send the first storage request to the operation server. The first storage request may carry the device identifier of the terminal, the new application public key, and the first to-be-verified signature information.

At 209, the operation server receives the first storage request sent by the terminal and carrying the device identifier of the terminal, the new application public key, and the first to-be-verified signature information.

In some embodiments, after the terminal sends, to the operation server, the first storage request carrying the local device identifier, the new application public key, and the first to-be-verified signature information, the operation server may receive the first storage request.

At 210, the operation server obtains the device public key corresponding to the device identifier from the device public key management server, performs signature verification processing on the first to-be-verified signature information based on the device public key and the new application public key, and, if the signature verification succeeds, stores the new application public key.

In some embodiments, after receiving the first storage request sent by the terminal, the operation server may parse the first storage request to obtain the device identifier, the new application public key, and the first to-be-verified signature information carried in the first storage request. Then, the operation server may obtain the device public key corresponding to the device identifier carried in the storage request from the device public key management server, perform signature verification processing on the first to-be-verified signature information based on the obtained device public key and the application public key, and determine whether the signature verification succeeds. If the signature verification succeeds, the operation server may delete the original application public key corresponding to the device identifier and correspondingly store the device identifier and the new application public key. Otherwise, the operation server does not perform the foregoing processing.

Figure 3:
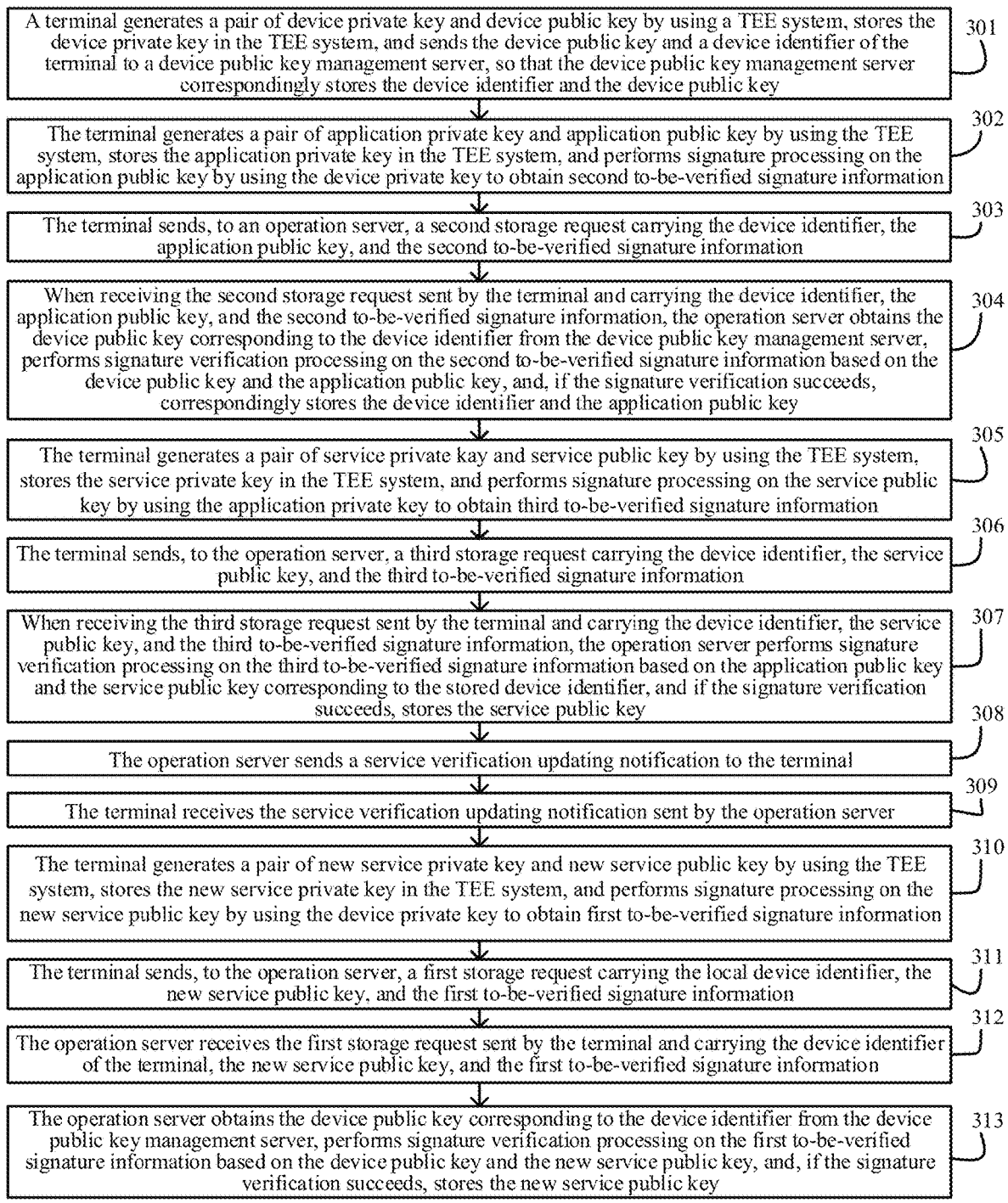
FIG. 3 is a flowchart of a key updating method according to another embodiment of the present disclosure.

In some embodiments, the foregoing key updating procedure may be applied to update a service verification key (which may also be referred to as a third-level key). FIG. 2 is a flowchart showing a method for updating the application verification key consistent with the disclosure. As shown in FIG. 3, at 301, a terminal generates a pair of device private key and device public key (i.e., the first-level key above) by using a TEE system, stores the device private key in the TEE system, and sends the device public key and a device identifier of the terminal to a device public key management server, so that the device public key management server correspondingly stores the device identifier and the device public key.

At 302, the terminal generates a pair of application private key and application public key by using the TEE system, stores the application private key in the TEE system, and performs signature processing on the application public key by using the device private key, to obtain second to-be-verified signature information.

At 303, the terminal sends, to an operation server, a second storage request carrying the device identifier, the application public key, and the second to-be-verified signature information.

At 304, when receiving the second storage request sent by the terminal and carrying the device identifier, the application public key, and the second to-be-verified signature information, the operation server obtains the device public key corresponding to the device identifier from the device public key management server, performs signature verification processing on the second to-be-verified signature information based on the device public key and the application public key, and, if the signature verification succeeds, correspondingly stores the device identifier and the application public key.

At 305, the terminal generates a pair of service private key and service public key by using the TEE system, stores the service private key in the TEE system, and performs signature processing on the service public key by using the application private key to obtain third to-be-verified signature information.

The service verification key includes the service private key and the service public key, and can be used for verifying legality of a specific service logic. The service private key is stored in a secure storage area. The service public key is stored in the operation server. A quantity of service verification keys is not limited, and can be controlled by a service provider.

In some embodiments, an application program installed on the terminal may be used for implementing processing of multiple services. In addition, biometric feature information may have been recorded for the multiple services by a user. That is, signature processing may have been performed on the multiple services. Different services of the application program may correspond to different service verification keys. For example, fingerprint verification processes are respectively set for a login service and a payment service of WeChat by the user, and may be separately referred to as a fingerprint login service and a fingerprint payment service. The two services may correspond to different service verification keys and correspond to a same application verification key (the application verification key includes an application private key and an application public key). When a starting instruction of a service in the application program is received, for example, when the user starts the fingerprint payment service, the terminal is triggered to receive a starting instruction of the fingerprint payment service, a pair of service private key and service public key may be generated by using the TEE system in the terminal. The service private key has a correspondence with an account logged into the application program. Signature processing may be performed on the service public key by using the prestored application private key, to obtain the third to-be-verified signature information.

At 306, the terminal sends, to the operation server, a third storage request carrying the device identifier, the service public key, and the third to-be-verified signature information.

In some embodiments, after obtaining the third to-be-verified signature information, the terminal may send the third storage request to the operation server. The third storage request may carry the device identifier, the service public key, and the third to-be-verified signature information.

At 307, when receiving the third storage request sent by the terminal and carrying the device identifier, the service public key, and the third to-be-verified signature information, the operation server performs signature verification processing on the third to-be-verified signature information based on the prestored application public key and the service public key corresponding to the device identifier, and, if the signature verification succeeds, stores the service public key.

In some embodiments, after the terminal sends, to the operation server, the third storage request carrying the device identifier, the service public key, and the third to-be-verified signature information, the operation server may receive the third storage request sent by the terminal, and parse the third storage request to obtain the device identifier, the service public key, and the third to-be-verified signature information carried in the third storage request. Then, the operation server may perform the signature verification processing on the third to-be-verified signature information based on the prestored application public key and service public key corresponding to the device identifier, determine whether the signature verification succeeds, and, if the signature verification succeeds, correspondingly store the service public key. The storage request sent by the terminal may further carry an account identifier. The operation server may correspondingly store the device identifier, the account identifier, and the service public key.

At 308, the operation server sends a service verification key updating notification to the terminal when receiving the third storage request.

At 309, the terminal receives the service verification key updating notification sent by the operation server.

At 310, the terminal generates a pair of new service private key and new service public key by using the TEE system of the terminal, stores the new service private key in the TEE system, and performs signature processing on the new service public key by using the device private key to obtain first to-be-verified signature information.

In some embodiments, update processing for a service verification key is similar to a process of generating a service verification key. Specifically, after receiving the key updating notification sent by the operation server, the terminal may start a key generation application in the TEE system, and generate, according to hardware information of the terminal and a preset algorithm, the pair of new service private key and new service public key matching with each other. Then, the terminal may delete the original service private key stored locally, and store the new service private key in a key storage area of the TEE system. At the same time, the terminal may perform signature processing on the new service public key by using a device verification key, thereby obtaining the first to-be-verified signature information.

At 311: The terminal sends, to the operation server, a first storage request carrying the local device identifier, the new service public key, and the first to-be-verified signature information.

In some embodiments, after generating the first to-be-verified signature information, the terminal may send the first storage request to the operation server. The first storage request may carry the device identifier of the terminal, the new service public key, and the first to-be-verified signature information.

At 312, the operation server receives the first storage request sent by the terminal and carrying the device identifier of the terminal, the new service public key, and the first to-be-verified signature information.

In some embodiments, after the terminal sends, to the operation server, the first storage request carrying the local device identifier, the new service public key, and the first to-be-verified signature information, the operation server may receive the first storage request.

At 313, the operation server obtains the device public key corresponding to the device identifier from the device public key management server, performs signature verification processing on the first to-be-verified signature information based on the device public key and the new service public key, and, if the signature verification succeeds, stores the new service public key.

In some embodiments, after receiving the first storage request sent by the terminal, the operation server may parse the first storage request to obtain the device identifier, the new service public key, and the first to-be-verified signature information carried in the first storage request. Then, the operation server may obtain the device public key corresponding to the device identifier carried in the storage request from the device public key management server, perform the signature verification processing on the first to-be-verified signature information based on the obtained device public key and the service public key, and determine whether the signature verification succeeds. If the signature verification succeeds, the operation server may delete the original service public key corresponding to the device identifier, and correspondingly stores the device identifier and the new service public key. Otherwise, the operation server does not perform the foregoing processing.

Figure 4:
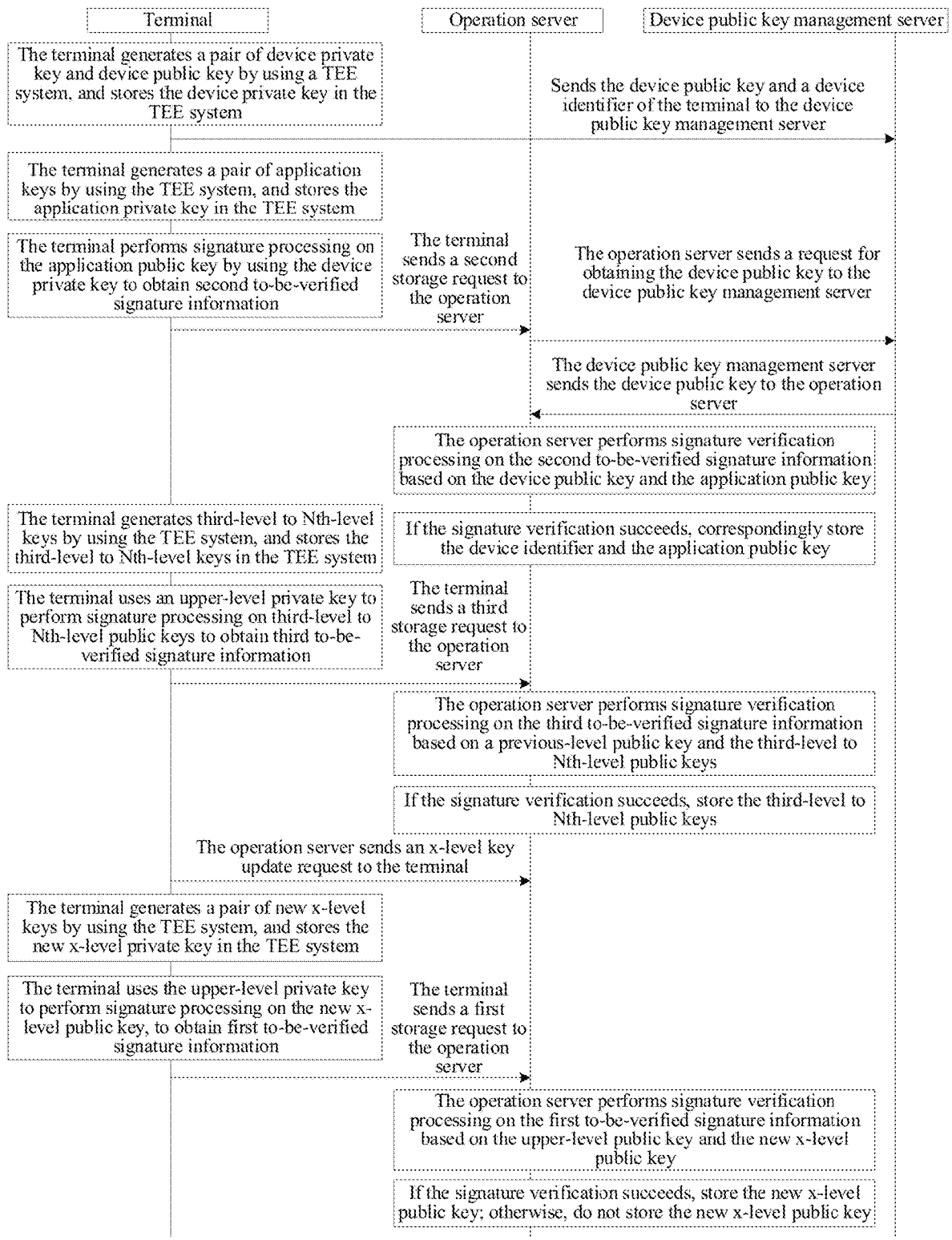
FIG. 4 is a flowchart of a key updating method according to another embodiment of the present disclosure.
Figure 5:
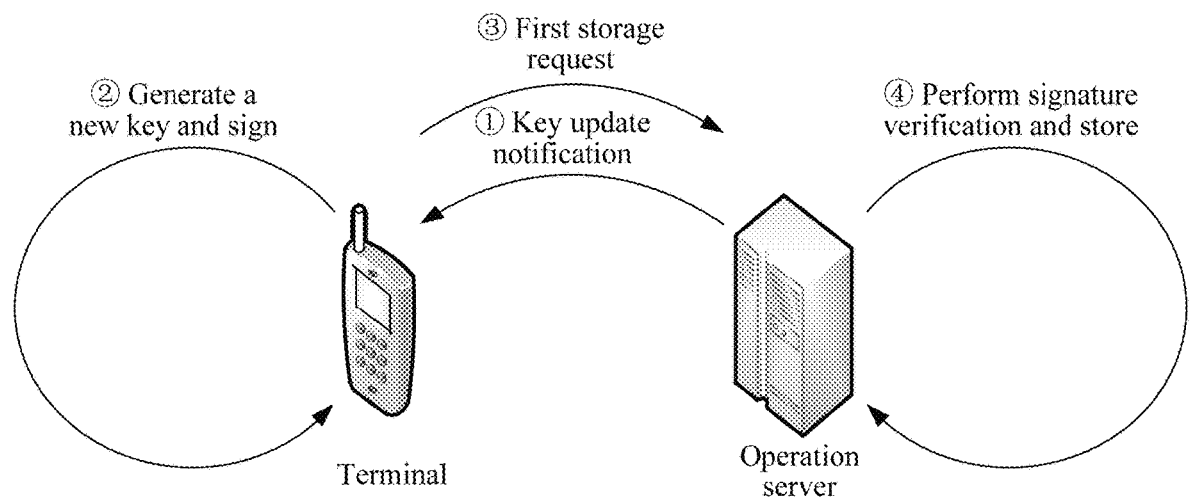
FIG. 5 is a block diagram of a key updating system according to an embodiment of the present disclosure.

In addition, an update procedure of fourth to Nth-level verification keys is basically similar to the update procedure of the service verification key, and is not described herein again. For a specific procedure, reference can be made to FIG. 4. FIG. 5 shows a system architecture in this embodiment.

Consistent with the disclosure, a key updating notification sent by an operation server is received, a pair of new private key and new public key is generated by using a TEE system of a terminal, the new private key is stored in the TEE system, signature processing is performed on the new public key by using an upper-level private key of the new private key to obtain first to-be-verified signature information, and a first storage request carrying a local device identifier, the new public key, and the first to-be-verified signature information is sent to the operation server. The operation server obtains a prestored upper-level public key corresponding to the device identifier, performs signature verification processing on the first to-be-verified signature information based on the upper-level public key, and, if the signature verification succeeds, stores the new public key. In this key updating process, signature processing is performed on a new key by using an upper-level key. Because the upper-level key is relatively less frequently used and is not easy to be disclosed, validity and security of the new key may be improved, and therefore security of updating a key is relatively high.

Figure 6:
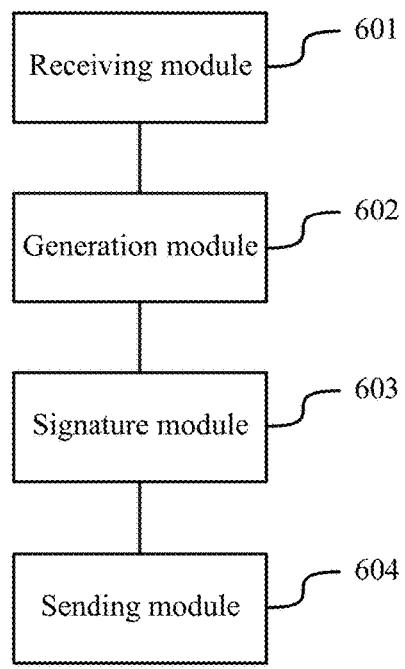
FIG. 6 is a schematic structural diagram of a terminal according to an embodiment of the present disclosure.

Based on the same technical concept, embodiments of the present disclosure further provide a terminal. FIG. 6 shows a schematic structural diagram of a terminal consistent with the disclosure. As shown in FIG. 6, the terminal includes a receiving module 601, a generation module 602, a signature module 603, and a sending module 604.

The receiving module 601 is configured to receive a key updating notification sent by an operation server.

The generation module 602 is configured to generate a pair of new private key and new public key by using a TEE system of the terminal, and store the new private key in the TEE system.

The signature module 603 is configured to perform signature processing on the new public key by using an upper-level private key of the new private key, to obtain first to-be-verified signature information.

The sending module 604 is configured to send, to the operation server, a first storage request carrying a local device identifier, the new public key, and the first to-be-verified signature information, so that the operation server obtains a prestored upper-level public key corresponding to the device identifier, performs signature verification processing on the first to-be-verified signature information based on the upper-level public key, and if the signature verification succeeds, stores the new public key.

In some embodiments, the new private key is a new application private key, the new public key is a new application public key, and the upper-level private key is a device private key.

The generation module 602 is further configured to, before receiving the key updating notification sent by the operation server, generate a pair of device private key and device public key by using the TEE system, store the device private key in the TEE system, and send the device public key and the device identifier of the terminal to a device public key management server, so that the device public key management server correspondingly stores the device identifier and the device public key.

In some embodiments, the new private key is a new service private key, the new public key is a new service public key, and the upper-level private key is an application private key.

The generation module 602 is further configured to, before receiving the key updating notification sent by the operation server, generate a pair of device private key and a device public key by using the TEE system, store the device private key in the TEE system, and send the device public key and the device identifier of the terminal to a device public key management server, so that the device public key management server correspondingly stores the device identifier and the device public key.

The generation module 602 is further configured to, before receiving the key updating notification sent by the operation server, generate a pair of application private key and application public key by using the TEE system, store the application private key in the TEE system, and perform signature processing on the application public key by using the device private key to obtain second to-be-verified signature information.

The sending module 604 is further configured to send, to the operation server, a second storage request carrying the device identifier, the application public key, and the second to-be-verified signature information.

Figure 7:
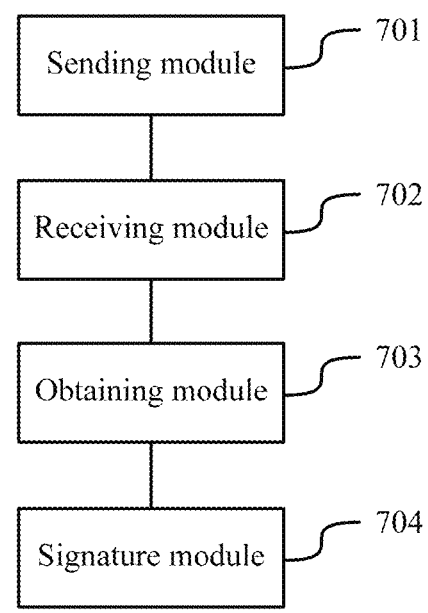
FIG. 7 is a schematic structural diagram of an operation server according to an embodiment of the present disclosure.

Based on the same technical concept, embodiments of the present disclosure further provide an operation server. FIG. 7 shows a schematic structural diagram of an operation server consistent with the disclosure. As shown in FIG. 7, the operation server includes a sending module 701, a receiving module 702, an obtaining module 703, and a signature verification module 704.

The sending module 701 is configured to send a key updating notification to a terminal.

The receive module 702 is configured to receive a first storage request sent by the terminal and carrying a device identifier of the terminal, a new public key, and first to-be-verified signature information.

The obtaining module 703 is configured to obtain a prestored upper-level public key corresponding to the device identifier.

The signature verification module 704 is configured to perform signature verification processing on the first to-be-verified signature information based on the upper-level public key and the new public key, and, if the signature verification succeeds, store the new public key.

In some embodiments, the new public key is a new application public key, the upper-level public key is a device public key, and the obtaining module 703 is configured to obtain a device public key corresponding to the device identifier from a device public key management server.

In some embodiments, the new public key is a new service public key, the upper-level public key is an application public key, and the obtaining module 703 is configured to obtain an application public key corresponding to the device identifier and stored locally.

In some embodiments, the receive module 702 is further configured to: before sending the key updating notification to the terminal, receive a second storage request sent by the terminal and carrying the device identifier of the terminal, the application public key, and the second to-be-verified signature information. In these embodiments, the signature verification module 704 is further configured to, before sending the key updating notification to the terminal, obtain, from the device public key management server, a device public key corresponding to the device identifier, perform signature verification processing on the second to-be-verified signature information based on the device public key and the application public key, and, if the signature verification succeeds, store the application public key.

In some embodiments, the sending module 701 is further configured to, if it is detected that a duration of a public key stored locally reaches a preset duration threshold after being generated, obtain a prestored device identifier corresponding to the public key, and send the key updating notification to a terminal corresponding to the device identifier. In some other embodiments, the sending module 701 is further configured to, when a key updating request sent by a terminal is received, send the key updating notification to the terminal.

Based on the same technical concept, embodiments of the present disclosure further provide a key updating system. The system includes an operation server and a terminal.

The terminal is configured to receive a key updating notification sent by the operation server, generate a pair of new private key and new public key by using a TEE system of the terminal, store the new private key in the TEE system, perform signature processing on the new public key by using an upper-level private key of the new private key to obtain first to-be-verified signature information, and send, to the operation server, a first storage request carrying a local device identifier, the new public key, and the first to-be-verified signature information, so that the operation server obtains a prestored upper-level public key corresponding to the device identifier, performs signature verification processing on the first to-be-verified signature information based on the upper-level public key, and, if the signature verification succeeds, stores the new public key.

The operation server is configured to send a key updating notification to the terminal, receive the first storage request sent by the terminal and carrying the device identifier of the terminal, the new public key, and the first to-be-verified signature information, obtain the prestored upper-level public key corresponding to the device identifier, perform signature verification processing on the first to-be-verified signature information based on the upper-level public key and the new public key, and, if the signature verification succeeds, store the new public key.

Consistent with the present disclosure, a key updating notification sent by an operation server is received, a pair of new private key and new public key is generated by using a TEE system of a terminal, the new private key is stored in the TEE system, signature processing is performed on the new public key by using an upper-level private key of the new private key to obtain first to-be-verified signature information, and a first storage request carrying a local device identifier, the new public key, and the first to-be-verified signature information is sent to the operation server, so that the operation server obtains a prestored upper-level public key corresponding to the device identifier, performs signature verification processing on the first to-be-verified signature information based on the upper-level public key, and, if the signature verification succeeds, stores the new public key. In this key updating process, signature processing is performed on a new key by using an upper-level key. Because the upper-level key is relatively less frequently used and is not easy to be disclosed, validity and security of the new key may be improved, and therefore security of updating a key is relatively high.

Figure 8:
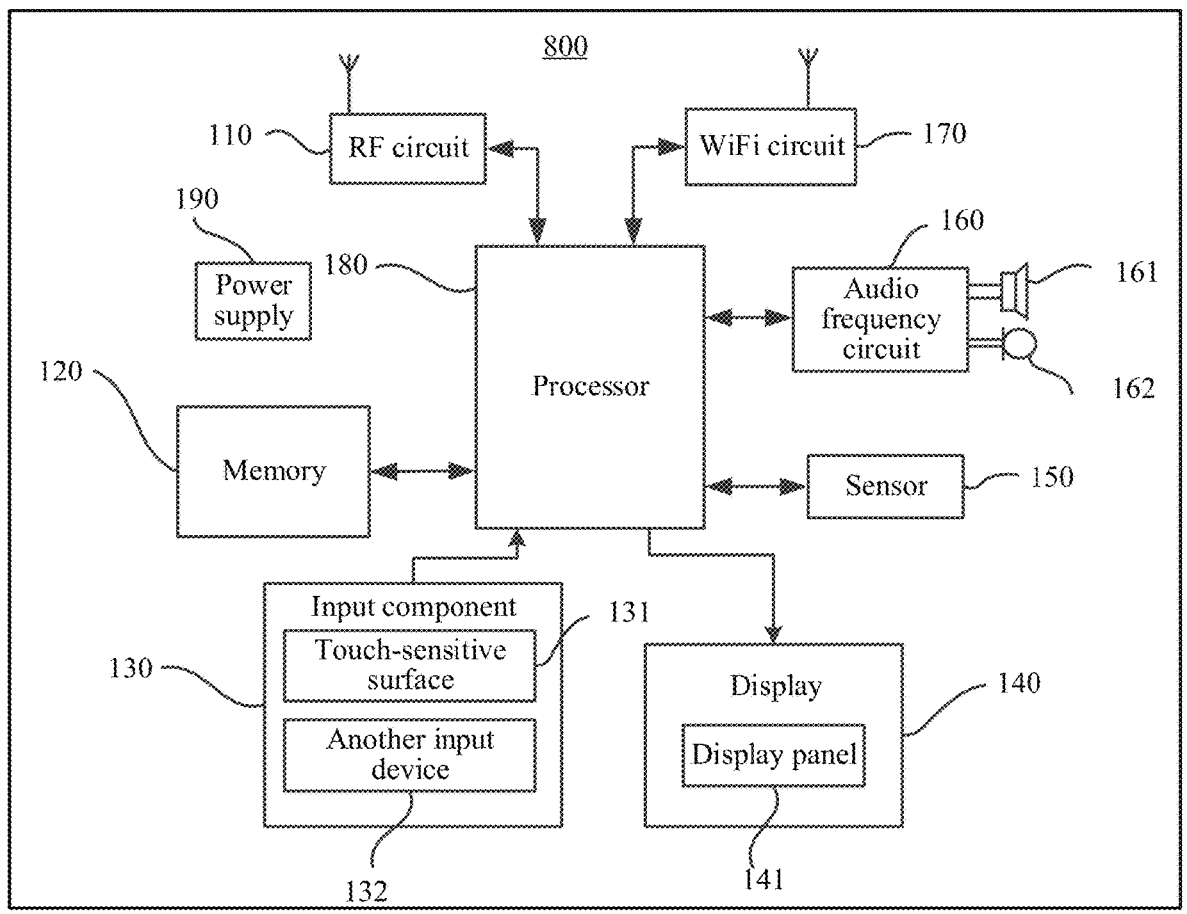
FIG. 8 is a schematic structural diagram of a terminal according to another embodiment of the present disclosure.

Embodiments of the present disclosure further provide a terminal. FIG. 8 is a schematic structural diagram of another terminal 800 consistent with the disclosure. The terminal 800 includes a touch-sensitive surface. The terminal may be used for implementing the service processing method in the foregoing embodiments.

As shown in FIG. 8, the terminal 800 includes components such as a Radio Frequency (RF) circuit 110, a memory 120 including one or more computer readable storage media, an input component 130, a display 140, a sensor 150, an audio frequency circuit 160, a wireless fidelity (WiFi) circuit 170, a processor 180 including one or more processing cores, and a power supply 190. Persons skilled in the art may understand that the structure of the terminal shown in FIG. 8 does not constitute a limitation to the terminal 800, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit 110 may receive downlink information from a base station, then deliver the downlink information to one or more processors 180 for processing, and send related uplink data to the base station. Generally, the RF circuit 110 includes but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program or module. The processor 180 runs the software program or module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 800, and the like. In addition, the memory 120 may include a high speed random access memory, and/or a non-volatile memory, such as at least one of a magnetic disk storage device, a flash memory, or another non-volatile solid-state storage device. Correspondingly, the memory 120 may further include a memory controller, so as to provide access of the processor 180 and the input component 130 to the memory 120.

The input component 130 may be configured to receive input digit or character information, and generate a keyboard, mouse, joystick, optical, or track ball signal input related to user settings or function controls. In some embodiments, as shown in FIG. 8, the input component 130 includes a touch-sensitive surface 131 and another input device 132. The touch-sensitive surface 131, which may also be referred to as a touch screen or a touch panel, may detect a touch operation of a user on or near the touch-sensitive surface (such as an operation of a user on or near the touch-sensitive surface 131 by using any suitable object or accessory, such as a finger or a stylus), and drive a corresponding connected apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch signal from the touch detection apparatus, converts the touch signal into touch point coordinates, and sends the touch point coordinates to the processor 180. Moreover, the touch controller can receive and execute a command sent by the processor 180. In addition, the touch-sensitive surface 131 may be a resistive, capacitive, infrared, or surface sound wave type touch-sensitive surface. In addition to the touch-sensitive surface 131, the input component 130 may further include the other input device 132. Specifically, the other input device 132 may include, but is not limited to, one or more of a physical keyboard, a functional key (such as a volume control key or a switch key), a track ball, a mouse, and a joystick.

The display 140 may be configured to display information input by the user or information provided for the user, and various graphical user interfaces of the terminal 800. The graphical user interfaces may be formed by a graph, text, an icon, a video, or any combination thereof. The display 140 includes a display panel 141. In some embodiments, the display panel 141 may be configured using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180 for determining the type of the touch event. Then, the processor 180 provides a corresponding visual output on the display panel 141 according to the type of the touch event. Although, in FIG. 8, the touch-sensitive surface 131 and the display panel 141 are used as two separate parts to implement input and output functions, in some embodiments, the touch-sensitive surface 131 and the display panel 141 may be integrated to implement the input and output functions.

The terminal 800 further includes at least one sensor 150, such as an optical sensor, a motion sensor, or another sensor. Specifically, the optical sensor may include an ambient light sensor and a proximity sensor. The ambient light sensor can adjust luminance of the display panel 141 according to the intensity of the ambient light. The proximity sensor may switch off the display panel 141 and/or backlight when the terminal 800 is moved close to the ear. As one type of the motion sensor, a gravity acceleration sensor can detect magnitude of accelerations in various directions (generally on three axes), may detect a magnitude and a direction of the gravity when the terminal 800 is static, and may be applied to an application that recognizes the attitude of the mobile phone (for example, switching between landscape orientation and portrait orientation, a related game, and magnetometer attitude calibration), a function related to vibration recognition (such as a pedometer and a knock), or the like. Other sensors, such as a gyroscope, a barometer, a hygrometer, a thermometer, and an infrared sensor, may also be configured in the terminal 800, and are not further described herein.

The terminal 800 further includes a speaker 161 and a microphone 162. The audio circuit 160, the speaker 161, and the microphone 162 may provide audio interfaces between the user and the terminal 800. The audio circuit 160 may convert received audio data into an electric signal and transmit the electric signal to the speaker 161. The speaker 161 may convert the electric signal into a sound signal for output. On the other hand, the microphone 162 may convert a collected sound signal into an electric signal. The audio circuit 160 may receive the electric signal and convert the electric signal into audio data, and output the audio data to the processor 180 for processing. Then, the processor 180 may send the audio data to, for example, another terminal by using the RF circuit 110, or output the audio data to the memory 120 for further processing. The audio circuit 160 may further include an earplug jack, so as to provide communication between a peripheral earphone and the terminal 800.

WiFi is a short distance wireless transmission technology. The terminal 800 may assist, by using the WiFi circuit 170, the user to receive and send e-mails, browse webpages, access streaming media, and so on, which provides wireless broadband Internet access for the user. Although FIG. 8 shows the WiFi circuit 170, it may be understood that the WiFi circuit 170 is not a necessary component of the terminal 800, and when required, the WiFi circuit 170 may be omitted as long as the scope of the essence of the present disclosure is not changed.

The processor 180 is the control center of the terminal 800, and is connected to various parts of the terminal by using various interfaces and/or wires. By running or executing the software program and/or module stored in the memory 120, and invoking data stored in the memory 120, the processor 180 performs various functions and data processing of the terminal 800, thereby performing overall monitoring on the terminal. In some embodiments, the processor 180 may include one or more processing cores. In some embodiments, the processor 180 may include an application processor and a modem. The application processor mainly processes an operating system, a user interface, an application program, and the like. The modem mainly processes wireless communication. It may be understood that the foregoing modem may be not integrated in the processor 180.

The terminal 800 further includes the power supply 190 (such as a battery) for supplying power to various components. In some embodiments, the power supply may be logically connected to the processor 180 through a power management system. Functions such as charging, discharging, and power consumption management can be implemented by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 800 may further include a camera, a Bluetooth module, and the like, which are not further described herein. Specifically, in some embodiments, the display of the terminal 800 includes a touch screen display, and the terminal 800 further includes a memory and one or more programs. The one or more programs are stored in the memory and are configured to be executed by one or more processors for performing a method consistent with the disclosure, such as one of the above-described example methods. In some embodiments, the one or more programs include instructions used for performing the following operations: receiving a key updating notification sent by an operation server, generating a pair of new private key and new public key by using a TEE system of the terminal, storing the new private key in the TEE system, performing signature processing on the new public key by using an upper-level private key of the new private key to obtain first to-be-verified signature information, and sending, to the operation server, a first storage request carrying a local device identifier, the new public key, and the first to-be-verified signature information, so that the operation server obtains a prestored upper-level public key corresponding to the device identifier, performs signature verification processing on the first to-be-verified signature information based on the upper-level public key, and, if the signature verification succeeds, stores the new public key.

Optionally, the new private key is a new application private key, the new public key is a new application public key, and the upper-level private key is a device private key.

The terminal is further configured to, before receiving the key updating notification sent by the operation server, generate a pair of device private key and device public key by using the TEE system, store the device private key in the TEE system, and send the device public key and the device identifier of the terminal to a device public key management server, so that the device public key management server correspondingly stores the device identifier and the device public key.

Optionally, the new private key is a new service private key, the new public key is a new service public key, and the upper-level private key is an application private key.

The terminal is further configured to, before receiving the key updating notification sent by the operation server, generate a pair of device private key and device public key by using the TEE system, store the device private key in the TEE system, and send the device public key and the device identifier of the terminal to the device public key management server, so that the device public key management server correspondingly stores the device identifier and the device public key.

The generation module is further configured to, before receiving the key updating notification sent by the operation server, generate a pair of application private key and application public key by using the TEE system, store the application private key in the TEE system, and perform signature processing on the application public key by using the device private key to obtain second to-be-verified signature information.

The terminal is further configured to send, to the operation server, a second storage request carrying the device identifier, the application public key, and the second to-be-verified signature information.

Consistent with the present disclosure, a key updating notification sent by an operation server is received, a pair of new private key and new public key is generated by using a TEE system of a terminal, the new private key is stored in the TEE system, signature processing is performed on the new public key by using an upper-level private key of the new private key to obtain first to-be-verified signature information, and a first storage request carrying a local device identifier, the new public key, and the first to-be-verified signature information is sent to the operation server, so that the operation server obtains a prestored upper-level public key corresponding to the device identifier, performs signature verification processing on the first to-be-verified signature information based on the upper-level public key, and, if the signature verification succeeds, stores the new public key. In this key updating process, signature processing is performed on a new key by using an upper-level key. Because the upper-level key is relatively less frequently used and is not easy to be disclosed, validity and security of the new key may be improved, and therefore security of updating a key is relatively high.

Figure 9:
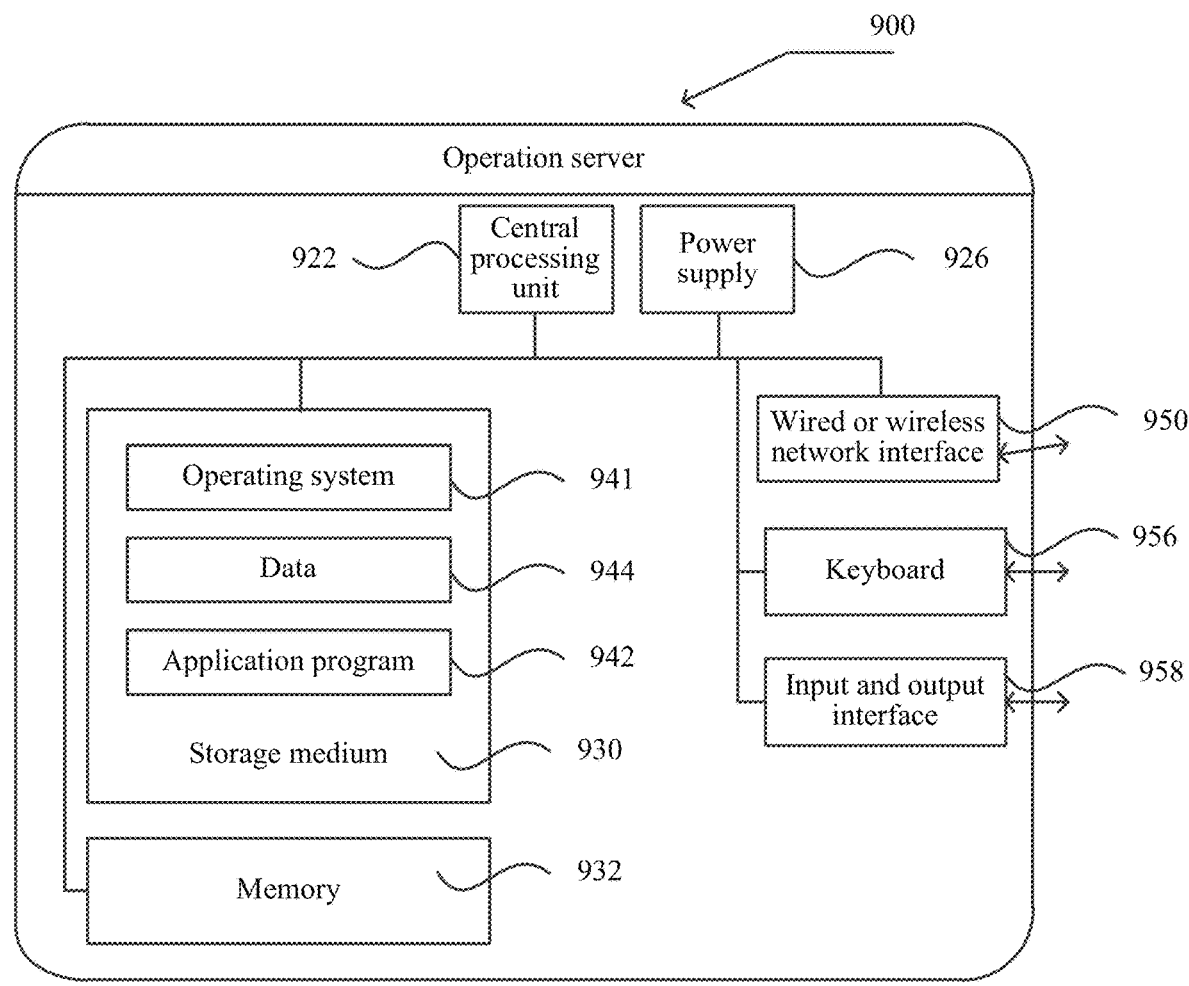
FIG. 9 is a schematic structural diagram of an operation server according to another embodiment of the present disclosure.

Embodiments of the present disclosure further provide an operation server. FIG. 9 is a schematic structural diagram of an operation server 900 according to an embodiment of the present disclosure. The operation server 900 may have different configuration or performance. As shown in FIG. 9, the operation server 900 includes one or more central processing units (CPU) 922 (for example, one or more processors), a memory 932, and one or more storage mediums 930 (for example, one or more mass storage devices) storing an application program 942 or data 944. The memory 932 and the storage medium 930 may perform storage temporally or permanently. The program stored in the storage medium 930 may include one or more modules (which is not marked in the figure), and each module may include a series of instruction operations in the server. Further, the central processing unit 922 may be configured to communicate with the storage medium 930, and execute, on the operation server 900, a series of instruction operations stored in the storage medium 930.

The operation server 900 further includes one or more power supplies 926, one or more wired or wireless network interfaces 950, one or more input and output interfaces 958, one or more keyboards 956, and one or more operating systems 941, for example, a Windows Server™, a Mac OS X™, a Unix™, a Linux™, and a FreeBSD™.

The operation server 900 may include a memory, and one or more programs, where the one or more programs are stored in the memory and are configured to be executed by one or more processors for performing a method consistent with the disclosure, such as one of the example methods described above. In some embodiments, the one or more programs include instructions used for performing the following operations: sending a key updating notification to a terminal, receiving a first storage request sent by the terminal and carrying a device identifier of the terminal, a new public key, and first to-be-verified signature information, obtaining a prestored upper-level public key corresponding to the device identifier, performing signature verification processing on the first to-be-verified signature information based on the upper-level public key and a new public key, and, if the signature verification succeeds, storing the new public key.

Optionally, the new public key is a new application public key, the upper-level public key is a device public key, and obtaining the prestored upper-level public key corresponding to the device identifier includes obtaining the device public key corresponding to the device identifier from a device public key management server.

Optionally, the new public key is a new service public key, the upper-level public key is an application public key, and obtaining the prestored upper-level public key corresponding to the device identifier includes obtaining the application public key corresponding to the device identifier and stored locally.

Optionally, before sending the key updating notification to the terminal, the operation server is further configured to receive a second storage request sent by the terminal and carrying the device identifier of the terminal, the application public key, and the second to-be-verified signature information, and obtain a device public key corresponding to the device identifier from the device public key management server, perform signature verification processing on the second to-be-verified signature information based on the device public key and the application public key, and, if the signature verification succeeds, store the application public key.

In some embodiments, sending the key updating notification to the terminal includes, if it is detected that a duration of a public key stored locally reaches a preset duration threshold after being generated, obtaining a prestored device identifier corresponding to the public key and sending the key updating notification to a terminal corresponding to the device identifier. In some other embodiments, sending the key updating notification to the terminal includes, when a key updating request sent by the terminal is received, sending the key updating notification to the terminal.

Consistent with the present disclosure, a key updating notification sent by an operation server is received, a pair of new private key and new public key is generated by using a TEE system of a terminal, the new private key is stored in the TEE system, signature processing is performed on the new public key by using an upper-level private key of the new private key to obtain first to-be-verified signature information, and a first storage request carrying a local device identifier, the new public key, and the first to-be-verified signature information is sent to the operation server, so that the operation server obtains a prestored upper-level public key corresponding to the device identifier, performs signature verification processing on the first to-be-verified signature information based on the upper-level public key, and, if the signature verification succeeds, stores the new public key. In this key updating process, signature processing is performed on a new key by using an upper-level key. Because the upper-level key is relatively less frequently used and is not easy to be disclosed, validity and security of the new key may be improved, and therefore security of updating a key is relatively high.

It should be noted that the key updating apparatus provided in the foregoing embodiments is merely described by using example divisions of the foregoing functional modules. In some other embodiments, the foregoing functions may be allocated to different functional modules according to a requirement. That is, an inner structure of the apparatus is divided into different functional modules to complete all or some of the functions described above. In addition, the key updating apparatus provided in the foregoing embodiments and the key updating method embodiments fall within a same conception. For details of a specific implementation process, reference can be made to the method embodiments. The details are not described again herein.

Persons of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the scope of the present disclosure.

What is claimed is:

1. A key verification method, comprising:
   generating, by a terminal, a device verification key by using a TEE (a trusted execution environment) system of the terminal, wherein the device verification key includes a device private key and a device public key, the device verification key is an upper-level key in verifying a lower-level key, and the lower-level key includes an application verification key;
   storing, by the terminal, the device private key in the TEE system of the terminal prior to being delivered by a manufacturer of the terminal;
   sending, by the terminal, the device public key and a device identifier of the terminal to a device public key management server for storage;
   generating, by the terminal, the application verification key using the TEE system of the terminal, wherein the application verification key includes an application private key and an application public key;
   storing, by the terminal, the application private key in the TEE system;
   performing, by the terminal, signature processing on the application public key using the device private key to obtain to-be-verified signature information; and
   sending, by the terminal to an operation server, a storage request carrying the device identifier, the application public key, and the to-be-verified signature information.

2. The key verification method of claim 1, wherein the storage request sent is for the application public key to be stored at the operation server once the to-be-verified signature information is verified at the operation server.

3. The key verification method of claim 2, wherein the to-be-verified information is first to-be-verified information and the storage request is a first storage request, the method further comprising:
   receiving, by the terminal, a key updating notification from the operation server;
   generating, by the terminal, a new application verification key using the TEE system of the terminal, wherein the new application verification key includes a new application private key and a new application public key;
   storing the new application private key in the TEE system;
   performing, by the terminal, signature processing on the new application public key using the application private key as an upper-level key in verifying the new application private key, to obtain second to-be-verified signature information; and
   sending, by the terminal to the operation server, a second storage request carrying the device identifier of the terminal, the new application public key, and the second to-be-verified signature information, for the new application public key to be stored at the operation server once the second to-be-verified signature information is verified at the operation server.

4. The key verification method of claim 2, wherein the to-be-verified information is first to-be-verified information and the storage request is a first storage request, the method further comprising:
   generating, by the terminal, a service verification key using the TEE system of the terminal, wherein the service verification key includes a service private key and a service public key;
   storing, by the terminal, the service private key in the TEE system;
   performing, by the terminal, signature processing on the service public key using the application private key to obtain second to-be-verified signature information; and
   sending, by the terminal to the operation server, a second storage request carrying the device identifier, the service public key, and the second to-be-verified signature information, for the service public key to be stored at the operation server once the second to-be-verified signature information is verified at the operation server.

5. The key verification method of claim 3, wherein the application verification key prior to the key updating notification is an old application verification key, the method further comprising:
   after generating the new application verification key, covering, by the terminal, the old application verification key.

6. The key verification method of claim 2, wherein the application verification key is generated by an application program installed in the terminal, and wherein the application verification key is used for verifying security or identity of the application program, and for generating one or more service verification keys.

7. The key verification method of claim 6, wherein the one or more service verification keys include a first service verification key and a second service verification key different than the first service verification key, the method further comprising:
generating, by the terminal, the first service verification key using the application verification key; and
generating, by the terminal, the second service verification key using the application verification key.

8. The key verification method of claim 7, wherein generating the first or the second service verification key comprises:
receiving, by the terminal, a starting instruction on a service in the application program; and
in response to receiving the starting instruction, generating the first or the second service verification key.

9. The key verification method of claim 4, wherein the service verification key corresponds with an account logged into the application program, and wherein the application verification key does not correspond with the account logged into the application program.

10. A key verification apparatus, comprising: a memory storing computer program instructions; and a processor coupled to the memory and configured to execute the computer program instructions and perform:
generating a device verification key by using a TEE (a trusted execution environment) system of the terminal, wherein the device verification key includes a device private key and a device public key, the device verification key is an upper-level key in verifying a lower-level key, and the lower-level key includes an application verification key;
storing the device private key in the TEE system of the terminal prior to being delivered by a manufacturer of the terminal;
sending the device public key and a device identifier of the terminal to a device public key management server for storage;
generating the application verification key using the TEE system of the terminal, wherein the application verification key includes an application private key and an application public key;
storing the application private key in the TEE system;
performing signature processing on the application public key using the device private key to obtain to-be-verified signature information; and
sending to an operation server, a storage request carrying the device identifier, the application public key, and the to-be-verified signature information.

11. The key verification apparatus of claim 10, wherein the storage request sent is for the application public key to be stored at the operation server once the to-be-verified signature information is verified at the operation server.

12. The key verification apparatus of claim 11, wherein the to-be-verified information is first to-be-verified information and the storage request is a first storage request, and wherein the processor is further configured to execute the computer program instructions and perform:
receiving a key updating notification from the operation server;
generating a new application verification key using the TEE system of the terminal, wherein the new application verification key includes a new application private key and a new application public key;
storing the new application private key in the TEE system;
performing signature processing on the new application public key using the application private key as an upper-level key in verifying the new application private key, to obtain second to-be-verified signature information; and
sending to the operation server, a second storage request carrying the device identifier of the terminal, the new application public key, and the second to-be-verified signature information, for the new application public key to be stored at the operation server once the second to-be-verified signature information is verified at the operation server.

13. The key verification apparatus of claim 12, wherein the to-be-verified information is first to-be-verified information and the storage request is a first storage request, and wherein the processor is further configured to execute the computer program instructions and perform:
generating a service verification key using the TEE system of the terminal, wherein the service verification key includes a service private key and a service public key;
storing the service private key in the TEE system;
performing signature processing on the service public key using the application private key to obtain second to-be-verified signature information; and
sending to the operation server, a second storage request carrying the device identifier, the service public key, and the second to-be-verified signature information, for the service public key to be stored at the operation server once the second to-be-verified signature information is verified at the operation server.

14. The key verification apparatus of claim 13, wherein the application verification key prior to the key updating notification is an old application verification key, and wherein the processor is further configured to execute the computer program instructions and perform:
after generating the new application verification key, covering the old application verification key.

15. The key verification apparatus of claim 11, wherein the application verification key is generated by an application program installed in the terminal, and wherein the application verification key is used for verifying security or identity of the application program, and for generating one or more service verification keys.

16. The key verification apparatus of claim 15, wherein the one or more service verification keys include a first service verification key and a second service verification key different than the first service verification key, and wherein the processor is further configured to execute the computer program instructions and perform:
generating the first service verification key using the application verification key; and
generating the second service verification key using the application verification key.

17. The key verification apparatus of claim 16, wherein generating the first or the second service verification key comprises:
receiving, by the terminal, a starting instruction on a service in the application program; and
in response to receiving the starting instruction, generating the first or the second service verification key.

18. The key verification apparatus of claim 13, wherein the service verification key corresponds with an account logged into the application program, and wherein the application verification key does not correspond with the account logged into the application program.

19. A non-transitory computer-readable storage medium storing computer program instructions executable by at least one processor to perform:

generating a device verification key by using a TEE (a trusted execution environment) system of the terminal, wherein the device verification key includes a device private key and a device public key, the device verification key is an upper-level key in verifying a lower-level key, and the lower-level key includes an application verification key;

storing the device private key in the TEE system of the terminal prior to being delivered by a manufacturer of the terminal;

sending the device public key and a device identifier of the terminal to a device public key management server for storage generating the application verification key using the TEE system of the terminal, wherein the application verification key includes an application private key and an application public key;

storing the application private key in the TEE system;

performing signature processing on the application public key using the device private key to obtain to-be-verified signature information; and sending to an operation server, a storage request carrying the device identifier, the application public key, and the to-be-verified signature information.

20. The non-transitory computer-readable storage medium of claim 19, wherein the storage request sent is for the application public key to be stored at the operation server once the to-be-verified signature information is verified at the operation server.

\* \* \* \* \*